United States Patent
De Haan et al.

[11] Patent Number: 5,929,919
[45] Date of Patent: *Jul. 27, 1999

[54] MOTION-COMPENSATED FIELD RATE CONVERSION

[75] Inventors: Gerard De Haan; Paul W. A. C. Biezen, both of Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/626,094

[22] Filed: Apr. 3, 1996

Related U.S. Application Data

[63] Continuation-in-part of application No. 08/417,718, Apr. 3, 1995, Pat. No. 5,532,750.

[30] Foreign Application Priority Data

Apr. 11, 1995 [EP] European Pat. Off. ............... 95200909

[51] Int. Cl.$^6$ ........................................................ H04N 7/01
[52] U.S. Cl. ................................................. 348/452; 348/699
[58] Field of Search ........................................ 348/384, 390, 348/443, 445, 446, 451, 452, 459, 699; H01N 7/01

[56] References Cited

U.S. PATENT DOCUMENTS

| | | | |
|---|---|---|---|
| 4,612,567 | 9/1986 | Prichard | 348/451 |
| 4,635,114 | 1/1987 | Wendland et al. | 348/452 |
| 5,036,393 | 7/1991 | Samad et al. | 348/452 |
| 5,208,667 | 5/1993 | Saunders | 348/452 |
| 5,268,751 | 12/1993 | Geiger et al. | 348/446 |
| 5,396,298 | 3/1995 | Hosokawa et al. | 348/452 |
| 5,446,497 | 8/1995 | Keating et al. | 348/452 |
| 5,495,300 | 2/1996 | De Haan et al. | 348/452 |
| 5,532,750 | 7/1996 | De Haan et al. | 348/452 |
| 5,534,946 | 7/1996 | De Haan et al. | 348/452 |
| 5,619,273 | 4/1997 | Sugiyama | 348/452 |

FOREIGN PATENT DOCUMENTS

0475499A1  8/1991  European Pat. Off. .

*Primary Examiner*—Richard Lee
*Attorney, Agent, or Firm*—Steven R. Biren

[57] ABSTRACT

In a method of processing input fields (I) of a picture signal to obtain interpolated fields (O) located temporally between the input fields (I), motion vectors (MV) are provided (30) between input fields (I), whereafter a quality (Err) of the motion vectors (MV) is assessed (40). In dependence upon the assessed quality (Err), the motion vectors (MV) are adapted (50, 60) such that both decreased and increased motion vector lengths occur in respective interpolated fields (O). The interpolated fields (O) are obtained (20) from the input fields (I) in dependence upon the thus adapted motion vectors (k*MV).

5 Claims, 3 Drawing Sheets

. . . . . . . 1
. . . . . . 2
. . . . . . 3

MOTION-COMPENSATED FIELD RATE CONVERSION

CROSS REFERENCE TO RELATED APPLICATION

This is a continuation-in-part of application Ser. No. 08/417,718, filed: Apr. 3, 1995, now U.S. Pat. No. 5,532,750.

BACKGROUND OF THE INVENTION

1. Field of the Invention

The invention relates to a motion-compensated field rate conversion, in which interpolated fields are obtained from input fields in dependence upon motion vectors.

2. Description of the Related Art

EP-A-0,475,499 discloses a system for field rate conversion in which the interpolated pictures result as shifted input fields. It is mentioned that, depending on the reliability of the motion vectors, the compensation can be more or less complete. In other words: if motion vectors are unreliable, their effect is reduced by multiplying them with a factor smaller than one. In the described case of a field rate doubler, the result is some 50 Hz motion judder which is not very objectionable and can be interpreted as a velocity depending blurring.

In field rate convertors with a higher or a non-integer ratio between the input and the output field rate, the effect of reduced motion compensation is the breakthrough of a much lower frequency in the motion judder. This frequency equals the largest common factor of the output and the input field rate. For example, an up-conversion from 24 Hz film material to 60 Hz video material, introduces a 12 Hz component in the motion judder. Apart from this long repetition period of the judder, the motion portrayal often is very irregular.

SUMMARY OF THE INVENTION

It is, inter alia, an object of the invention to provide a motion-compensated interpolation in which this disturbance is reduced. To this end, a first aspect of the invention provides a method of processing input fields of a picture signal to obtain interpolated fields located temporally between said input fields, the method comprising the steps of providing motion vectors between input fields; assessing a quality of said motion vectors; adapting said motion vectors in dependence upon said assessed quality to obtain adapted motion vectors, wherein said motion vectors are adapted such that both decreased and increased motion vector lengths occur in respective interpolated fields; and obtaining said interpolated fields from said input fields in dependence upon said adapted motion vectors. A second aspect of the invention provides an apparatus for processing input fields of a picture signal to obtain interpolated fields located temporally between said input fields, the apparatus comprising means for providing motion vectors between input fields; means for assessing a quality of said motion vectors; means for adapting said motion vectors in dependence upon said assessed quality to obtain adapted motion vectors, wherein said motion vectors are adapted such that both decreased and increased motion vector lengths occur in respective interpolated fields; and means for obtaining said interpolated fields from said input fields in dependence upon said adapted motion vectors. A third aspect of the invention provides a television signal receiver comprising means coupled to receive a television signal for furnishing a picture signal; an apparatus, as defined above, for processing input fields of said picture signal, to obtain interpolated fields; and display means coupled to said processing apparatus.

In a method of processing input fields of a picture signal to obtain interpolated fields located temporally between the input fields, motion vectors are provided between successive input fields, whereafter a quality of the motion vectors is assessed. In accordance with the present invention, the motion vectors are adapted in dependence upon the assessed quality, whereby both decreased and increased motion vector lengths occur in respective interpolated fields. The interpolated fields are obtained from the input fields in dependence upon the thus adapted motion vectors.

Thus, if the estimated motion vectors are not believed to be sufficiently reliable for use in a straightforward motion-compensated interpolation, there is provided a (partial) fall-back at a regular motion judder, preferably of the highest possible frequency, i.e., half the output field frequency. This judder, as any other, decreases the visibility of artifacts in the picture due to unreliable motion vectors, but as such, is much less annoying than the irregular and more low-frequent judder resulting from a straightforward down-scaling of the motion vectors as in the prior art. The present invention is applicable to field rate conversions between any input and output rate, and has the somewhat surprising property that the applied vector shifts are enlarged for some of the output fields.

When input video fields are motion compensated to realize video data at a certain output field frequency, the common procedure is to take information from the temporally nearest input fields (or from the two fields on either side of the required temporal instance) and to shift this data such that objects are positioned at the motion trajectory, i.e., the imaginary line through the time-position graph of the object. Depending on the temporal distance between the available field and the required field, the length of the motion vectors as calculated between successive input fields has to be divided by a factor. In the proposed global fall-back algorithm, this factor is adapted such that the position of moving objects is field alternatingly above or below the motion trajectory. Consequently, motion vectors are, in some fields, reduced, but in other fields, enlarged. Preferably, this adaptation of the motion vector lengths is not simply field alternating, but depends on the ratio between input and output field rate and on the choice of the input field(s) that is used after shifting over the estimated motion vector to provide the output field.

These and other aspects of the invention will be apparent from and elucidated with reference to the embodiments described hereinafter.

DESCRIPTION OF THE PREFERRED EMBODIMENTS

Figure 1:
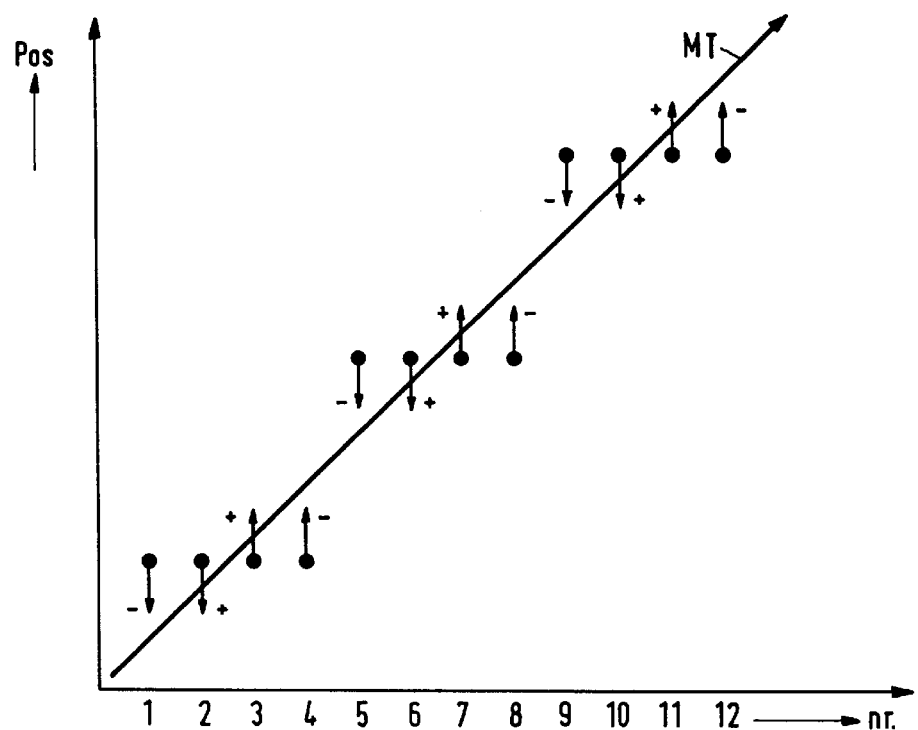
FIG. 1 illustrates a global fall-back according to the invention in the case of a 25 Hz film to 100 Hz video conversion.

In FIG. 1, an example is provided for the case of 25 Hz film to 100 Hz video up-conversion applying shifts to one nearby input field only. The horizontal axis indicates the field number, while the vertical axis indicates the position. Assuming a straight non-accelerated movement, an object would move along the motion trajectory MT, which is to be understood as a straight line drawn such that the deviation of the actual positions of the object in successive fields from this straight line is minimal on average; of course, this line may be shifted in time which shift corresponds to an overall processing delay. The small black circles indicate the position of an object in the 25 Hz input fields. The arrows indicate the motion vectors which are supposed to shift the object to the motion trajectory. However, when the motion vectors are not believed to be sufficiently reliable to be used without any further measures, the fall-back according to the present invention becomes active. As shown in FIG. 1, in the fall-back case, the motion vectors are twice enlarged (+), than twice shrunk (-), etc, so as to obtain positions of the moving object which are field-alternatingly above or below the motion trajectory MT. As indicated by the thus adapted arrows in the figure, exactly 50 movement phases per second result, i.e., the objects position in two successive fields is identical. This is just a choice, smaller and also larger deviations from the exact 25 to 100 Hz compensation are also possible. The choice may depend on the reliability of the motion vectors: the worse the (global) reliability, the larger the deviation from the ideal compensation in which all arrows would end on the motion trajectory MT.

Figure 2:
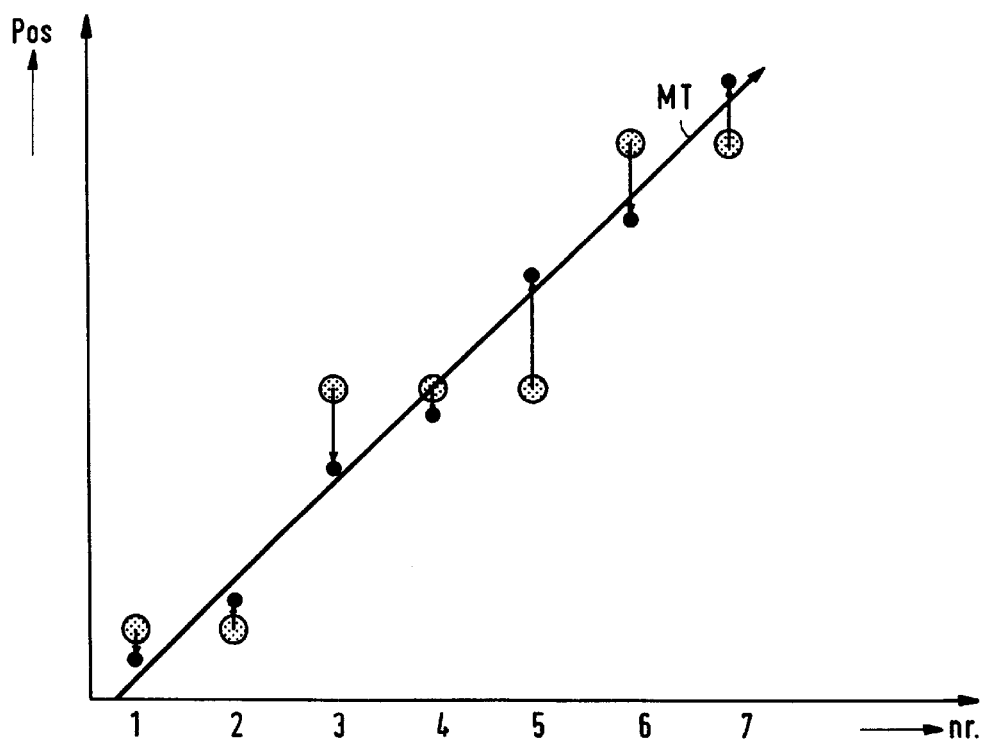
FIG. 2 illustrates the global fall-back mode according to the present invention for the case of a 24 Hz (film) to 60 Hz (video) conversion.

FIG. 2 shows a second example, where the current invention is elaborated for the case of 24 Hz film to 60 Hz video conversion. The large circles indicate the positions before compensation, while the small circles indicate the positions obtained after a partial motion-compensated interpolation according to the present invention. The large circles are formed by a standard 2–3 pull down conversion to obtain 60 output fields from 24 input fields. Again, in case of unreliable motion vectors, the motion vectors are adapted such that the positions of the moving object are field-alternatingly at one side or the other of the motion trajectory MT.

Figures 3, 6:
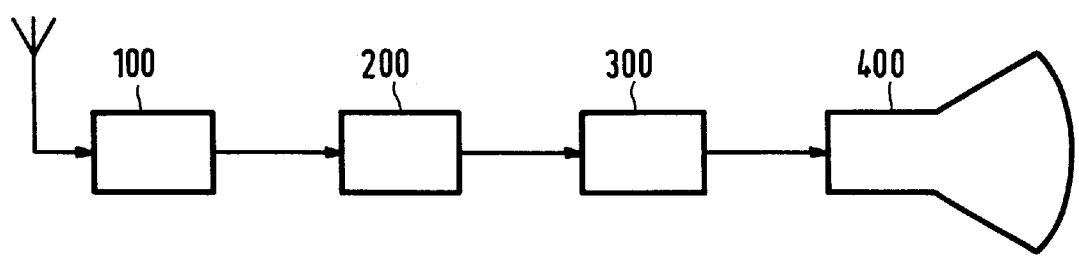
FIG. 3 illustrates an implementation of the global fall-back measure for a 60 Hz to 50 Hz field rate conversion.
FIG. 6 shows an embodiment of a television receiver in accordance with the present invention.

FIG. 3 shows how the same idea works out for a 60 Hz to 50 Hz video field rate conversion. The figure shows the original position of the (input) material in the first row (1), the fully compensated 60 Hz output in the last row (3), and between them, in row 2, the "partially corrected" interpolation result according to the present invention. Row 3 is obtained with a straightforward motion-compensated interpolation which can be used when the estimated motion vectors are sufficiently reliable. Row 2 shows positions which are alternatingly at the right-hand side and at the left-hand side of the corresponding positions in row 3. A position at the right-hand side of the corresponding position in row 3 is obtained by an enlarged motion vector, while a position at the left-hand side of the corresponding position in row 3 is obtained by a decreased motion vector.

In one particular embodiment, adapted scaling of the motion vectors was made depending on the measured contrasts in the velocity plane. If the x-component of two horizontally neighboring displacement vectors or the y-component of two vertically neighboring displacement vectors differed more than a first threshold value, a slight deviation from the scaling as required for a perfect motion compensation was introduced. If the difference was more than a second threshold the scaling was further adapted and so on. Obviously, any number of thresholds can be used in the implementation. The background of this particular adaptation is that the global reliability of motion vectors in a scene is expected to decrease if there are objects moving fast in different directions close to each other (input material grows more difficult with increasing velocities and particularly if the velocity field contains large contrasts). How rapidly the global vector reliability decreases depends on the applied estimation algorithm which therefore will determine the optimal thresholds to be used.

Figure 4:
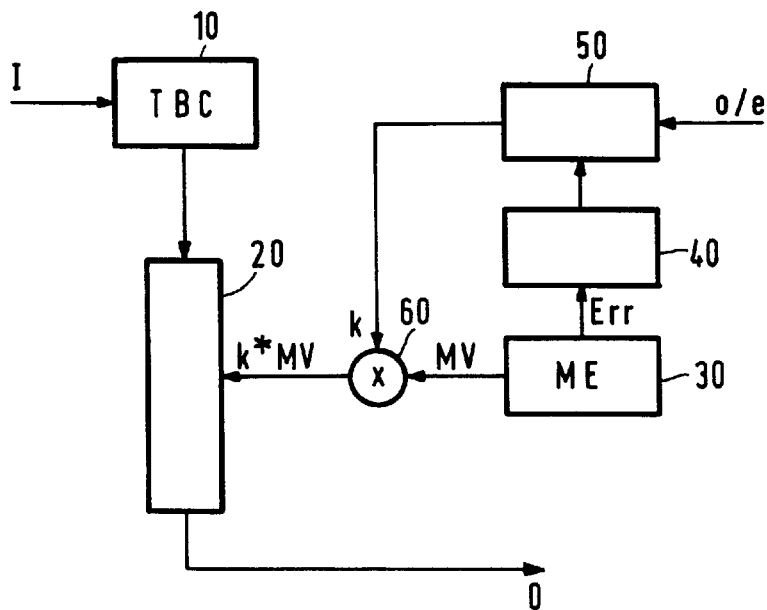
FIG. 4 illustrates a first embodiment of a motion-compensated interpolation circuit in accordance with the present invention.

FIG. 4 illustrates a first embodiment of a motion-compensated interpolation circuit in accordance with the present invention, in which an interpolated output field O is obtained by shifting a single input field I along the motion trajectory. The input signal is applied to a motion vector controllable variable delay circuit 20 thru a time base corrector (TBC) 10. A motion estimator (ME) 30 furnishes motion vectors MV. A fall-back detection circuit 40 is coupled to the motion estimator 30 to receive an error signal Err indicative of the consistency in the motion vector field, the estimation match errors, or some other information useful for determining the reliability of the estimated motion vectors. The fall-back detection circuit 40 determines whether the error signal Err deviates seriously enough from acceptable values and, if so, signals to a vector modifier 50 that the motion vectors MV produced by the motion estimator 30 should be adapted such that the visibility of motion estimation errors is reduced. The vector modifier 50 produces a vector length modifying factor k which is applied to a vector multiplier 60 for multiplying the horizontal and vertical components of the motion vectors MV from the motion estimator 30 by this factor k. It goes without saying that if no adaptation is necessary, the vector length modifying factor k solely depends on the temporal position of the interpolated field with regard to the corresponding input field. The thus modified motion vectors k*MV are applied to the variable delay 20 for controlling the motion vector dependent shift. The variable delay 20 produces the output fields O.

As mentioned above, if the motion vectors are to be adapted to reduce the visibility of motion vector estimation errors, they should be output-field-alternatingly adapted such that the positions of moving objects are at alternating sides of the motion trajectory. To this end, the vector modifier 50 receives an odd/even field identifier signal o/e. A field may be interlaced or non-interlaced.

Figure 5:
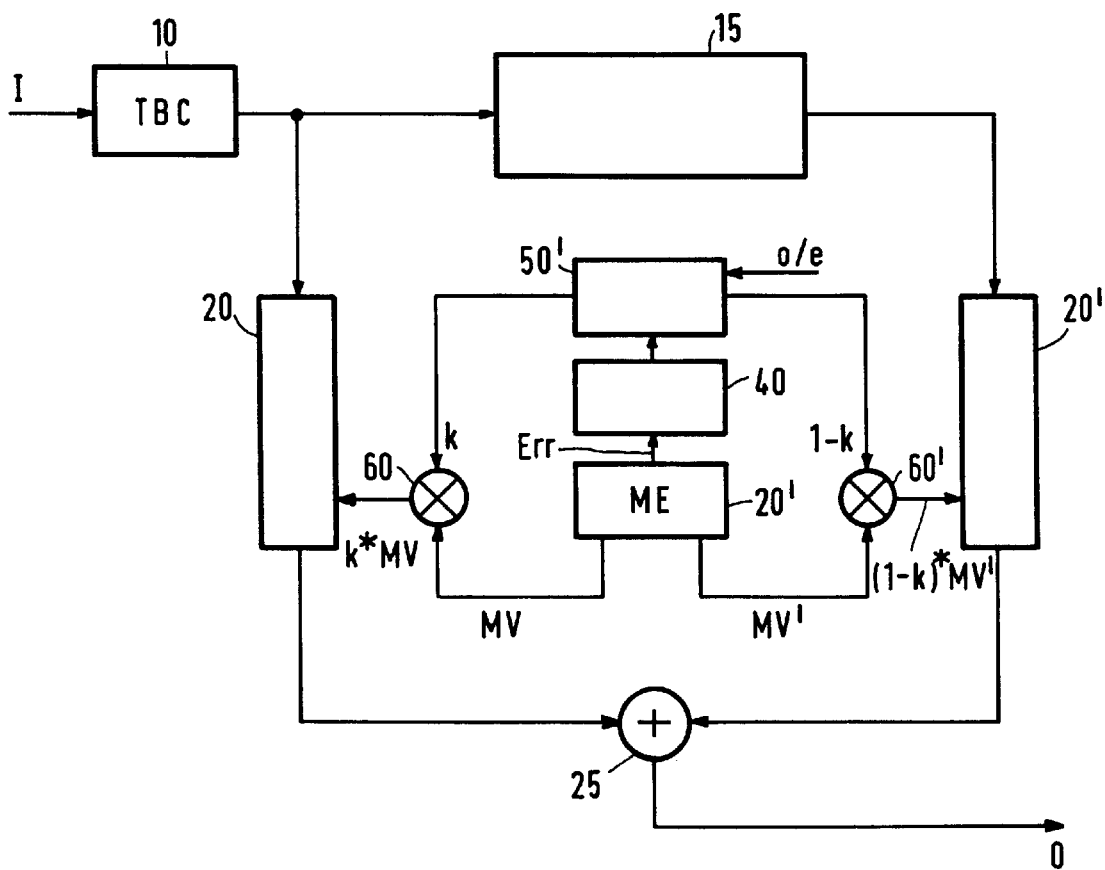
FIG. 5 illustrates a second embodiment of a motion-compensated interpolation circuit in accordance with the present invention.

FIG. 5 illustrates a second embodiment of a motion-compensated interpolation circuit in accordance with the present invention, in which an interpolated output field O is obtained by shifting two input fields I along the motion trajectory, and averaging the thus shifted input fields. The embodiment of FIG. 5 is much alike that of FIG. 4, so that a description of only the differences between these embodiments will suffice. The output signal of the time base corrector 10 is also applied to a second variable delay 20' through a field delay 15. The motion estimator 30 of FIG. 4 is replaced by a motion estimator 30' which produces, in addition to the above-mentioned motion vectors MV, motion vectors MV' for use with the other input field. The vector modifier 50 of FIG. 4 is replaced by a vector modifier 50' which produces, in addition to the above-mentioned factor k, a vector length modifying factor 1-k for use with the other input field. When two input fields are used in a motion-compensated interpolation, it will be clear that if the motion vectors MV to be used with one of these input fields are shortened (or made longer) by a factor k, the motion vectors MV' to be used with the other field are to be made longer (or shortened) by a corresponding factor 1-k. A vector multiplier 60' multiplies the horizontal and vertical components of the motion vectors MV' from the motion estimator 30' by this factor 1-k. The thus modified motion vectors (1-k)*MV' are applied to the variable delay 20' for controlling its motion vector dependent shift. An averager 25 receives respective motion-compensated shifted fields from the variable delays 20 and 20' for producing the output field O.

FIG. 6 shows an embodiment of a television receiver in accordance with the present invention. A tuner and IF circuit 100 receives antenna signals and furnishes demodulated video signals to a video processor 200. The video processor does all usual things like brightness and contrast control, and furnishes processed video signals as an input picture signal I to an upconverter 300 which may be either of the embodiments of FIGS. 4, or 5, to obtain interpolated output fields O. The upconverter 300 furnishes these interpolated output fields O to a display 400.

A main aspect of the invention can be summarized as follows. In pictures resulting from motion-compensated field rate convertors, artifacts resulting from motion vector estimation errors can occur in scenes with complicated or very fast motion. If these artifacts degrade the picture quality more than what is gained with motion compensation, it is good to gradually switch over to non-motion compensated interpolation. This disclosure describes an approach that yields considerably better results than a straightforward reduction of the motion vector length which is known from the prior art. In contrast with previous proposals, vector lengths are sometimes increased, so that both increased and decreased motion vector lengths occur in respective interpolated fields. Hereby, a motion judder is obtained which reduces the visibility of the motion vector estimation errors.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer. Clearly, sophistications in which the adaptation of the deviation is only allowed to change slowly in time are possible. These sophistications can be useful to prevent visible switching of the introduced global blur or motion error. In this disclosure and in the claims, a field may be interlaced or non-interlaced.

We claim:

1. A method of processing input fields of a picture signal to obtain interpolated fields located temporally between said input fields, the method comprising the steps of:

providing motion vectors between said input fields;

assessing a quality of said motion vectors;

adapting said motion vectors in dependence upon said assessed quality to obtain adapted motion vectors, wherein said motion vectors are adapted such that both decreased and increased motion vector lengths occur in respective interpolated fields; and obtaining said interpolated fields from said input fields in dependence upon said adapted motion vectors.

2. A method as claimed in claim 1, wherein said step of assessing a quality of said motion vectors includes the step of measuring contrasts in a velocity plane formed by said motion vectors.

3. A method as claimed in claim 2, wherein the step of measuring contrasts in a velocity plane formed by said motion vectors includes the step of comparing differences between horizontal and/or vertical components of motion vectors corresponding to neighboring image parts, to at least one threshold value, whereby the motion vectors are adapted in dependence upon whether said at least one threshold value is exceeded.

4. An apparatus for processing input fields of a picture signal to obtain interpolated fields located temporally between said input fields, the apparatus comprising:

means for providing motion vectors between said input fields;

means for assessing a quality of said motion vectors;

means for adapting said motion vectors in dependence upon said assessed quality to obtain adapted motion vectors, wherein said motion vectors are adapted such that both decreased and increased motion vector lengths occur in respective interpolated fields; and means for obtaining said interpolated fields from said input fields in dependence upon said adapted motion vectors.

5. A television signal receiver, comprising:

means coupled to receive a television signal for providing a picture signal;

an apparatus for processing input fields of said picture signal, to obtain interpolated fields; and display means coupled to said processing apparatus, wherein said processing apparatus comprises:

means for providing motion vectors between said input fields;

means for assessing a quality of said motion vectors;

means for adapting said motion vectors in dependence upon said assessed quality to obtain adapted motion vectors, wherein said motion vectors are adapted such that both decreased and increased motion vector lengths occur in respective interpolated fields; and means for obtaining said interpolated fields from said input fields in dependence upon said adapted motion vectors.

* * * * *